F. G. WALLACE.
Wheel Spoke Socket.
No. 101,948. Patented April 12, 1870.
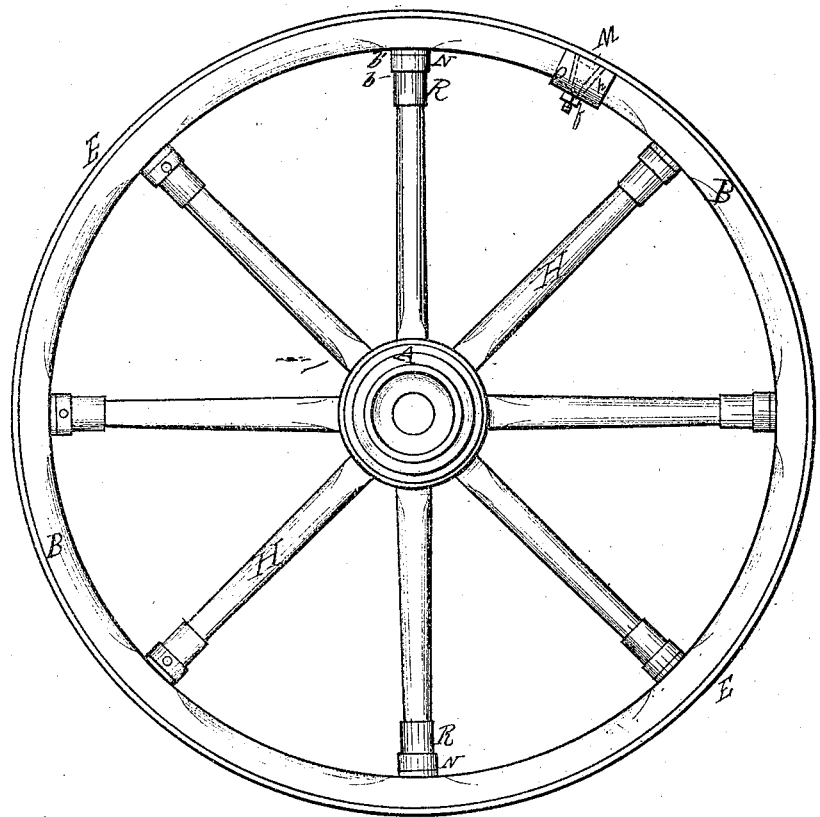
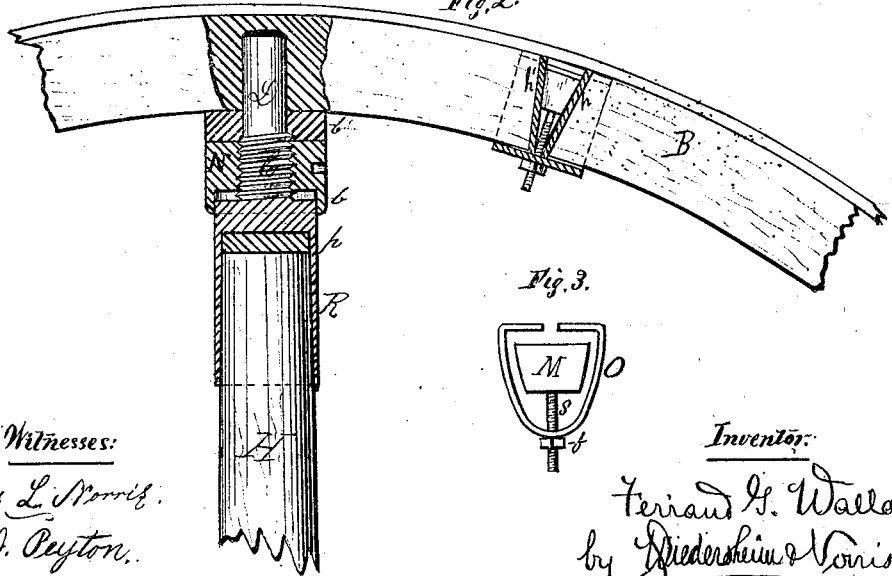
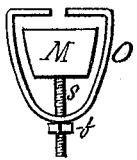
Witnesses:
James L. Norris
W. J. Peyton
Inventor:
Ferrand G. Wallace
by Wiedersheim & Norris
attys.

United States Patent Office.

FERRAND G. WALLACE, OF SYRACUSE, NEW YORK.

Letters Patent No. 101,948, dated April 12, 1870.

IMPROVEMENT IN WHEELS FOR VEHICLES.

The Schedule referred to in these Letters Patent and making part of the same.

*To all whom it may concern:*

Be it known that I, FERRAND G. WALLACE, of Syracuse, in the county of Onondaga and State of New York, have invented a new and useful Improvement in Wheels for Vehicles; and I do hereby declare that the following is a full, clear, and exact description of the same, reference being had to the accompanying drawings forming a part of this specification, in which—

Figure 1 is a perspective view of a wheel embodying my invention.

Figure 2 is a vertical central section of my improved devices attached to the wheel.

Figure 3 is a detached view of my improved device for tightening the tires of wheels.

Nature and Object of the Invention.

The nature of this invention consists in expanding and contracting the tires of carriage and other wheels by means of a metallic socket and nut applied to the ends of each spoke, and a wedged or screw-shaped device inserted in the joint or any other part or parts of the felloe, in order that the circumference of the felloe will be increased as the spoke is lengthened, by devices hereinafter described.

In the accompanying drawings fig. 1 shows a carriage-wheel, complete in itself, with my improvements attached.

A represents the hub of a wheel, made in the usual form and of any material.

H H' are the spokes.

B B, the felloe or felloes.

E, the tire.

Upon the outer ends of the spokes H, I place a metallic socket or ferrule of any shape or configuration, which embraces the spoke part way up toward the hub.

Formed with this socket is a point or projection, D, which projects down through a part of the felloe or felloes B B.

Upon this point or projection D, for a suitable distance, is formed or cut a screw-thread, C, upon which is placed a screw-threaded nut, N, which overlaps the socket R, as the length of the spoke is increased or decreased by turning the nut N upon the point or projection D to the right or left. The outer surface of this nut may be provided with one hole or more, or may be of an octagonal or other form, for the purpose of attaching a wrench or other suitable device to operate it.

A metallic band, O, formed in one piece or split on one side, encircles the felloe or felloes B B, at one or more parts of the felloe, within which is placed a metallic wedge-shaped block, having formed with it, or otherwise secured, a threaded projection or bolt, which extends through the metal band O, upon which a nut, $f$, works. This wedge-shaped block, when placed in the felloe or felloes of the wheel B B, increases or diminishes, as is desired, the circumference of the felloe or felloes, as the screw-nut $f$ is screwed up or down upon the bolt, point, or projection of the wedge-shaped block M, pressing apart and increasing their circumference, causing them to fit tightly within the tire.

This block can operate against the plain surface of the felloe or felloes, if desired, or may be used in connection with the metal plates $h\ h$, as shown. These metal plates $h\ h$ may be flat pieces of metal, or may be so formed or constructed as to have a socket for the ends of the felloe or felloes B B.

Within the socket R, where the spoke H rests, or between the nut N and the felloe or felloes B B, I sometimes place rubber packing or other elastic material, for the purpose of giving tension to the wheel, and to prevent somewhat the jars occasioned by passing over stony or rough ground; also preventing the wear of the spoke and felloe; also to keep them compact and tight in dry or wet weather.

It will be readily seen that my attachment can be applied to old as well as new wheels. With these improved attachments it will also be seen that I have constructed a carriage-wheel presenting a neat appearance, in fact scarcely discernible when applied to the wheel and painted a color corresponding to that of the wheel.

Having thus described my invention,

What I claim is—

A metal socket or ferrule, R, having a point or projection, D, and nut N, when combined with a wedge-shaped block, M, inserted between the joint or joints or other parts of the felloe, for the purpose of lengthening the spokes, and at the same time tightening the tires of carriage-wheels, substantially as shown and described.

The above signed by me the 2d day of March, 1870.

FERRAND G. WALLACE.

Witnesses:
ISAAC D. GARFIELD,
ARTHUR BEEBE.